(12) United States Patent
Shekar et al.

(10) Patent No.: US 12,374,081 B2
(45) Date of Patent: Jul. 29, 2025

(54) DIGITAL IMAGE PROCESSING TECHNIQUES USING BOUNDING BOX PRECISION MODELS

(71) Applicant: Optum, Inc., Minnetonka, MN (US)

(72) Inventors: Swaroop S. Shekar, Mysore (IN); Atul Subhash, Bengaluru (IN); Veera Raghavendra Chikka, Hyderabad (IN); Vamsi M. Bhandaru, Hyderabad (IN)

(73) Assignee: OPTUM, INC., Minnetonka, MN (US)

( * ) Notice: Subject to any disclaimer, the term of this patent is extended or adjusted under 35 U.S.C. 154(b) by 443 days.

(21) Appl. No.: 17/658,154

(22) Filed: Apr. 6, 2022

(65) Prior Publication Data
US 2023/0326179 A1 Oct. 12, 2023

(51) Int. Cl.
| | |
|---|---|
| *G06V 10/764* | (2022.01) |
| *G06V 10/26* | (2022.01) |
| *G06V 10/774* | (2022.01) |
| *G06V 30/148* | (2022.01) |
| *G06V 30/19* | (2022.01) |
| *G06V 30/40* | (2022.01) |
| *G06V 30/414* | (2022.01) |

(52) U.S. Cl.
CPC ............ *G06V 10/764* (2022.01); *G06V 10/26* (2022.01); *G06V 10/774* (2022.01); *G06V 30/153* (2022.01); *G06V 30/19173* (2022.01); *G06V 30/40* (2022.01); *G06V 30/414* (2022.01)

(58) Field of Classification Search
CPC .... G06V 30/414; G06V 10/26; G06V 10/774; G06V 30/413
See application file for complete search history.

(56) References Cited

U.S. PATENT DOCUMENTS

| | | | |
|---|---|---|---|
| 10,268,883 B2 | 4/2019 | Sarkar et al. | |
| 11,087,123 B2 | 8/2021 | Chitta et al. | |
| 2021/0034856 A1* | 2/2021 | Torres | G06V 30/414 |
| 2021/0117667 A1 | 4/2021 | Mehra et al. | |

(Continued)

FOREIGN PATENT DOCUMENTS

CN 112132054 A 12/2020

OTHER PUBLICATIONS

Brodic, Darko et al. "Text Line Segmentation With the Algorithm Based on the Oriented Anisotropic Gaussian Kernel," Journal of Electrical Engineering, vol. 64, No. 4, Nov. 4, 2013, pp. 238-243.

(Continued)

*Primary Examiner* — Peter K Huntsinger
(74) *Attorney, Agent, or Firm* — Alston & Bird LLP

(57) ABSTRACT

Various embodiments of the present invention provide methods, apparatus, systems, computing devices, computing entities, and/or the like for performing digital image processing operations. For example, as described herein, various embodiments of the present invention relate to performing digital image processing operations using at least one of using bounding box precision models to generate an optimal object differentiation kernel, using an optimal object differentiation kernel to generate/detect optimal bounding boxes of an image set, and using an image classification machine learning model to generate bounding box classifications for the optimal bounding boxes of an image set.

20 Claims, 10 Drawing Sheets

(56) References Cited

U.S. PATENT DOCUMENTS

| | | | |
|---|---|---|---|
| 2021/0192201 A1* | 6/2021 | Nguyen | G06V 30/413 |
| 2021/0279461 A1 | 9/2021 | Sarkar et al. | |
| 2021/0279516 A1 | 9/2021 | Staar et al. | |
| 2021/0390704 A1 | 12/2021 | Fujimoto et al. | |
| 2022/0319216 A1* | 10/2022 | Kolavennu | G06V 30/414 |
| 2023/0237827 A1* | 7/2023 | Yuan | G06V 10/945 |
| | | | 382/175 |

OTHER PUBLICATIONS

Chen, Yinpeng et al. "Dynamic Convolution: Attention over Convolution Kernels," In Proceedings of the IEEE/CVF Conference on Computer Vision and Pattern Recognition, Dec. 7, 2019, pp. 11030-11039, available online at https://openaccess.thecvf.com/content_CVPR_2020/papers/Chen_Dynamic_Convolution_Attention_Over_Convolution_Kernels_CVPR_2020_paper.pdf.

Girschick, Ross et al. "Rich Feature Hierarchies for Accurate Object Detection and Semantic Segmentation Tech Report (v5)," arXiv preprint arXiv:1311.2524v5 [cs.CV] Oct. 22, 2014, (21 pages), available online at https://arxiv.org/pdf/1311.2524.pdf.

Nazir, Danish et al. "HybridTabNet—Towards Better Table Detection in Scanned Document Images," Applied Sciences, vol. 11, No. 8396, Sep. 11, 2021, pp. 1-22, DOI: 10.3390/app11188396.

Ren, Shaoqing et al. "Faster R-CNN: Towards Real Object Detection With Region Proposals Networks," arXiv preprint arXiv:1506.01497v3 [cs.CV] Jan. 6, 2016, pp. 1-14, available online at https://arxiv.org/pdf/1506.01497.pdf.

Satopaa, Ville et al. "Finding a 'Kneedle' in a Haystack: Detecting Knee Points in System Behavior," in 31st International Conference on Distributed Computing Systems Workshops, Jun. 20, 2011, pp. 166-171, IEEE, available online at https://raghavan.usc.edu/papers/kneedle-simplex11.pdf.

Sermanet, Pierre et al. "OverFeat: Integrated Recognition, Localization and Detection Using Convolutional Networks," arXiv preprint arXiv:1312.6229v4 [cs.CV] Feb. 24, 2014, (16 pages), available online at https://arxiv.org/pdf/1312.6229.pdf.

Wu, Jialin et al. "Dynamic Filtering with Large Sampling Field for ConvNets," In Proceedings of the European Conference on Computer Vision (ECCV), vol. 11214, Oct. 6, 2018, pp. 188-203, DOI: 10.1007/978-3-030-01249-6_12.

Yang, Xiao et al. "Learning to Extract Semantic Structure From Documents Using Multimodal Fully Convolutional Neural Networks," In Proceedings of the IEEE Conference on Computer Vision and Pattern Recognition, Jun. 7, 2017, pp. 5315-5324.

* cited by examiner

DIGITAL IMAGE PROCESSING TECHNIQUES USING BOUNDING BOX PRECISION MODELS

BACKGROUND

Various embodiments of the present invention address technical challenges related to performing digital image processing operations and address the efficiency and reliability shortcomings of various existing digital image processing operations, in accordance with at least some of the techniques described herein.

BRIEF SUMMARY

In general, embodiments of the present invention provide methods, apparatus, systems, computing devices, computing entities, and/or the like for performing digital image processing operations. For example, as described herein, various embodiments of the present invention relate to performing digital image processing operations using at least one of using bounding box precision models to generate an optimal object differentiation kernel, using an optimal object differentiation kernel to generate/detect optimal bounding boxes of an image set, and using an image classification machine learning model to generate bounding box classifications for the optimal bounding boxes of an image set.

In accordance with one aspect, a method is provided. In one embodiment, the method comprises: identifying a bounding box precision model, wherein the bounding box precision model describes, for each candidate primary kernel dimension size in a primary kernel dimension size range, a corresponding resulting bounding box count when non-white areas of an image set are differentiated in accordance with a candidate object differentiation kernel whose primary kernel dimension size is determined based at least in part on the candidate primary kernel dimension size and whose secondary kernel dimension size is determined based at least in part on a predetermined secondary kernel dimension size; generating, based at least in part on the bounding box precision model, an optimal primary kernel dimension size of the primary kernel dimension size range, wherein the optimal primary kernel dimension size is determined based at least in part on the candidate primary kernel dimension size that is estimated to be associated with steepest decline in accordance with the bounding box precision model; generating, based at least in part on an optimal object differentiation kernel whose target kernel dimension size is determined based at least in part on the optimal primary kernel dimension size, one or more optimal bounding boxes; for each optimal bounding box, generating, using an image classification machine learning model and based at least in part on the optimal bounding box, a bounding box classification; and performing one or more prediction-based actions based at least in part on each bounding box classification.

In accordance with another aspect, a computer program product is provided. The computer program product may comprise at least one computer-readable storage medium having computer-readable program code portions stored therein, the computer-readable program code portions comprising executable portions configured to: identify a bounding box precision model, wherein the bounding box precision model describes, for each candidate primary kernel dimension size in a primary kernel dimension size range, a corresponding resulting bounding box count when non-white areas of an image set are differentiated in accordance with a candidate object differentiation kernel whose primary kernel dimension size is determined based at least in part on the candidate primary kernel dimension size and whose secondary kernel dimension size is determined based at least in part on a predetermined secondary kernel dimension size; generate, based at least in part on the bounding box precision model, an optimal primary kernel dimension size of the primary kernel dimension size range, wherein the optimal primary kernel dimension size is determined based at least in part on the candidate primary kernel dimension size that is estimated to be associated with steepest decline in accordance with the bounding box precision model; generate, based at least in part on an optimal object differentiation kernel whose target kernel dimension size is determined based at least in part on the optimal primary kernel dimension size, one or more optimal bounding boxes; for each optimal bounding box, generate, using an image classification machine learning model and based at least in part on the optimal bounding box, a bounding box classification; and perform one or more prediction-based actions based at least in part on each bounding box classification.

In accordance with yet another aspect, an apparatus comprising at least one processor and at least one memory including computer program code is provided. In one embodiment, the at least one memory and the computer program code may be configured to, with the processor, cause the apparatus to: identify a bounding box precision model, wherein the bounding box precision model describes, for each candidate primary kernel dimension size in a primary kernel dimension size range, a corresponding resulting bounding box count when non-white areas of an image set are differentiated in accordance with a candidate object differentiation kernel whose primary kernel dimension size is determined based at least in part on the candidate primary kernel dimension size and whose secondary kernel dimension size is determined based at least in part on a predetermined secondary kernel dimension size; generate, based at least in part on the bounding box precision model, an optimal primary kernel dimension size of the primary kernel dimension size range, wherein the optimal primary kernel dimension size is determined based at least in part on the candidate primary kernel dimension size that is estimated to be associated with steepest decline in accordance with the bounding box precision model; generate, based at least in part on an optimal object differentiation kernel whose target kernel dimension size is determined based at least in part on the optimal primary kernel dimension size, one or more optimal bounding boxes; for each optimal bounding box, generate, using an image classification machine learning model and based at least in part on the optimal bounding box, a bounding box classification; and perform one or more prediction-based actions based at least in part on each bounding box classification.

BRIEF DESCRIPTION OF THE DRAWINGS

Figure 1:
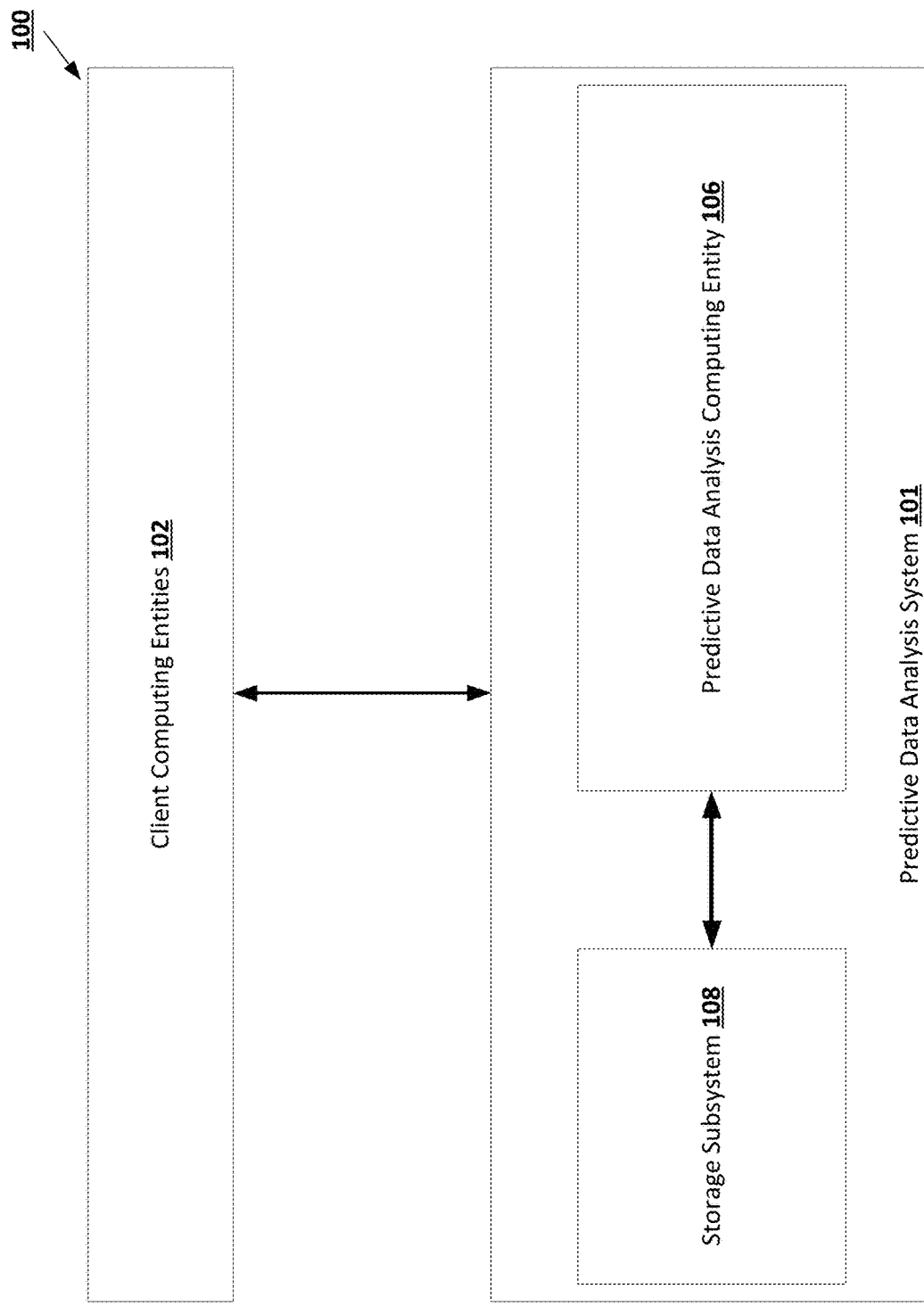

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
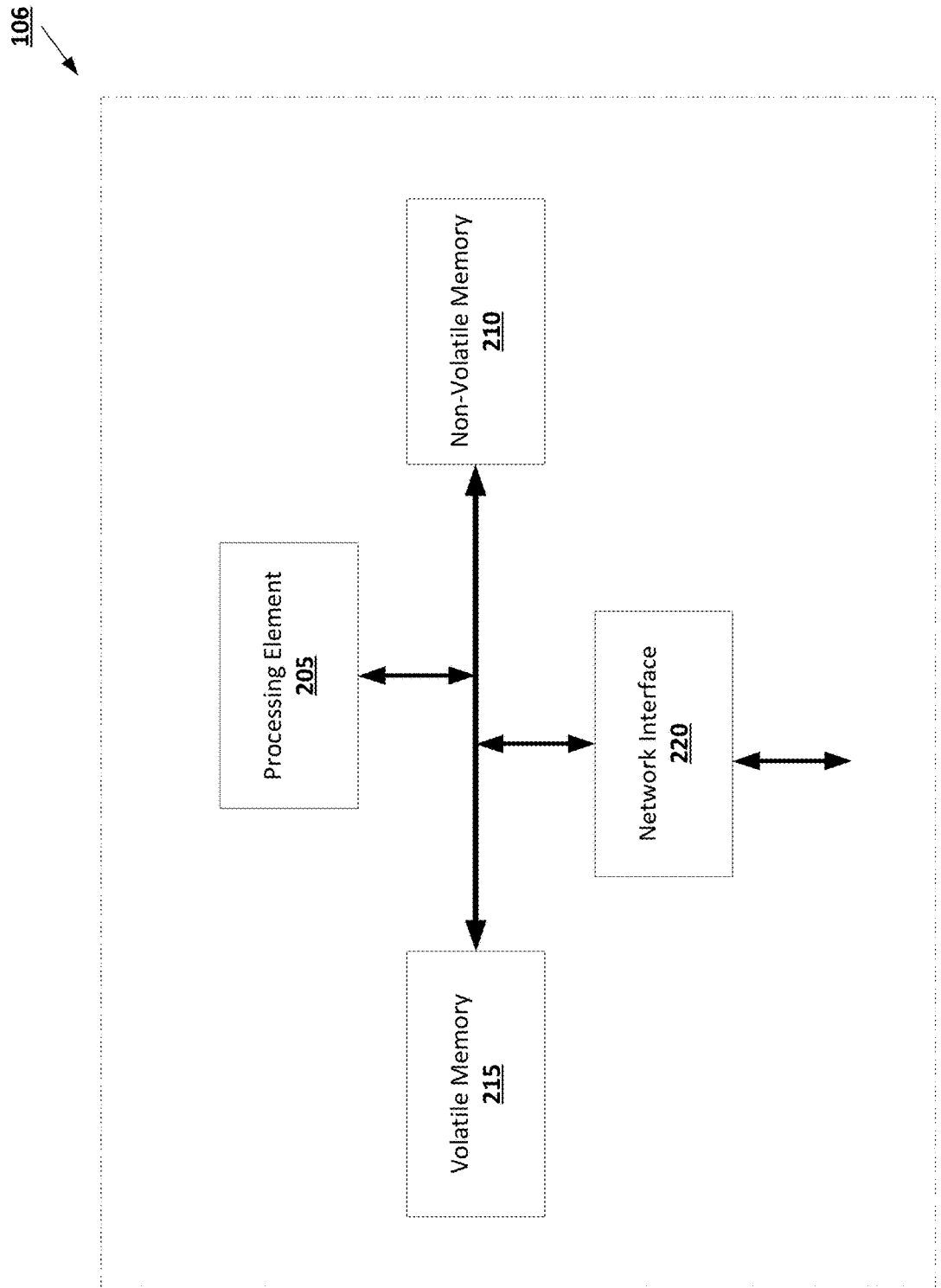

FIG. 2 provides an example predictive data analysis computing entity in accordance with some embodiments discussed herein.

Figure 3:
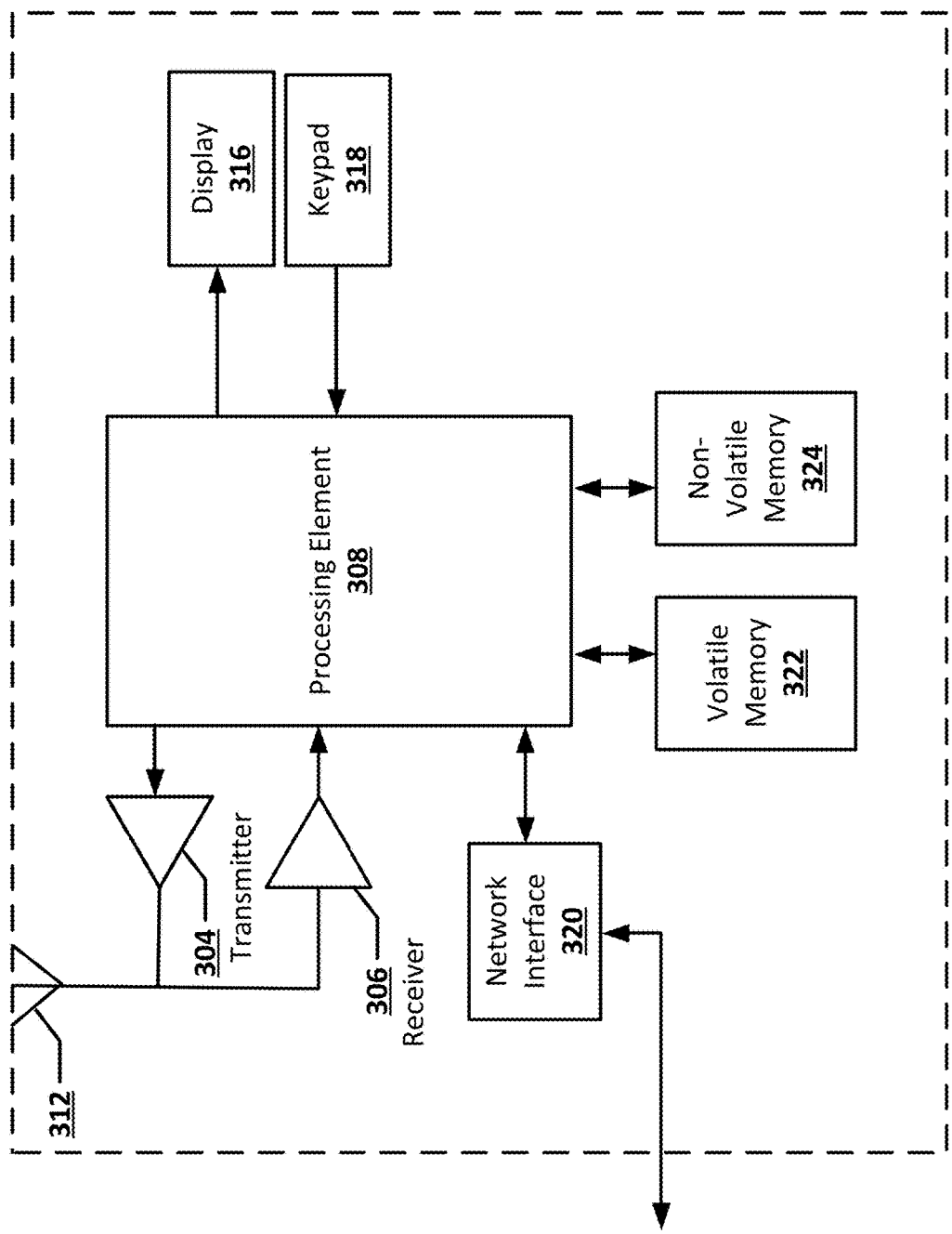

FIG. 3 provides an example client computing entity in accordance with some embodiments discussed herein.

Figure 4:
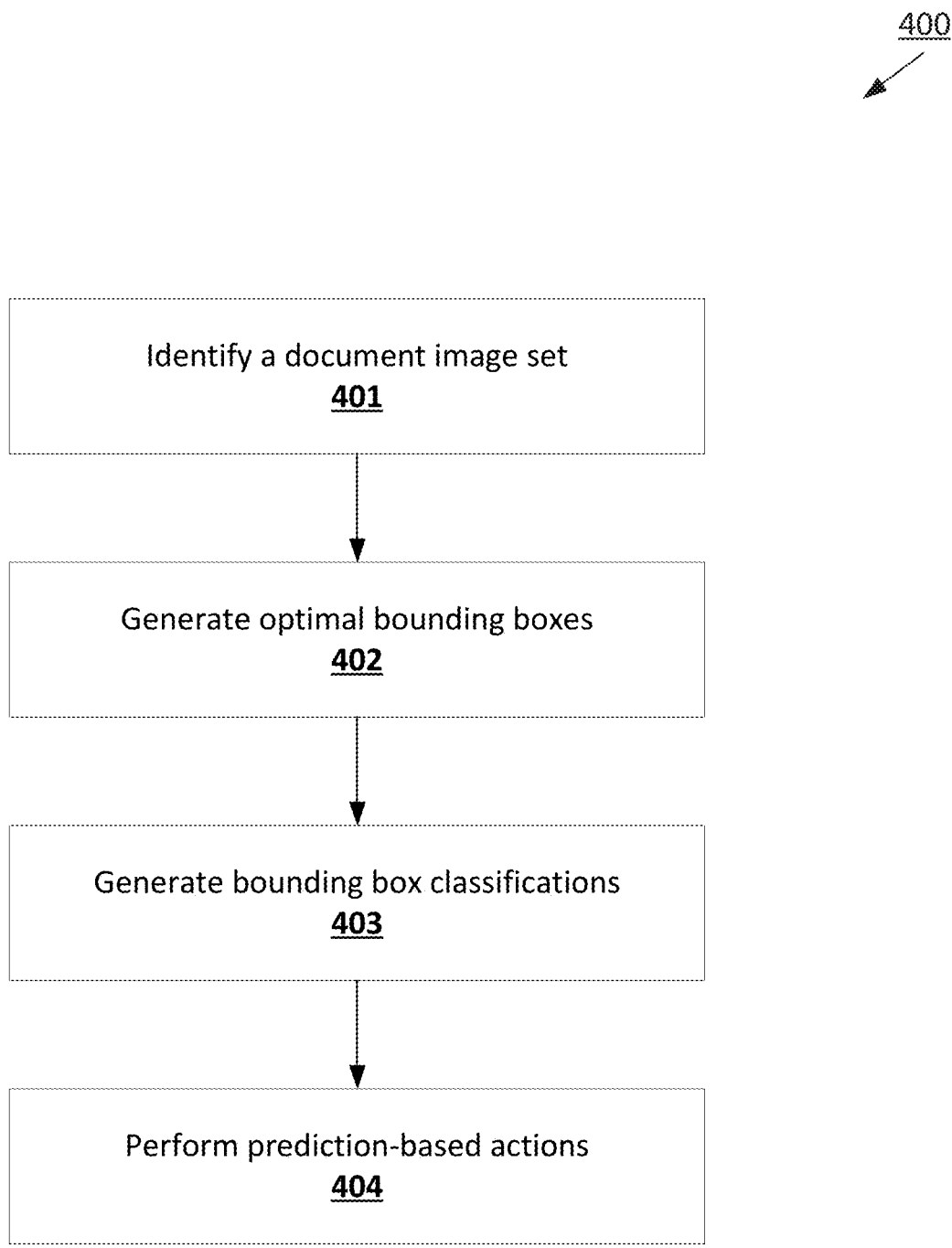

FIG. 4 is a flowchart diagram of an example process for performing image-based processing on a document image set that comprises a set of document images in accordance with some embodiments discussed herein.

Figure 5A:
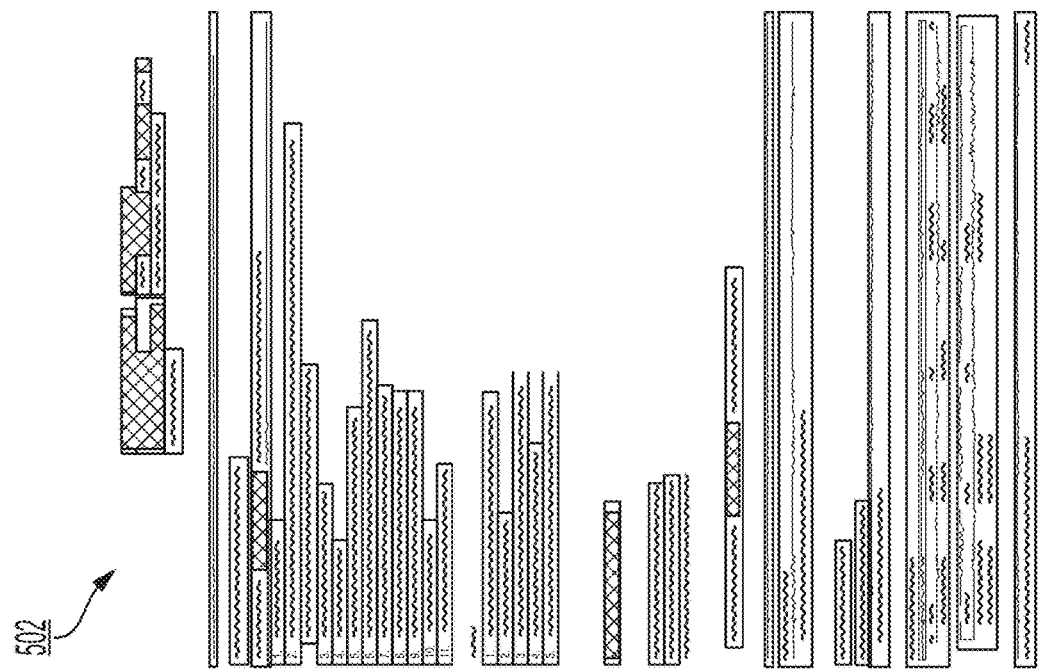
Figure 5A:
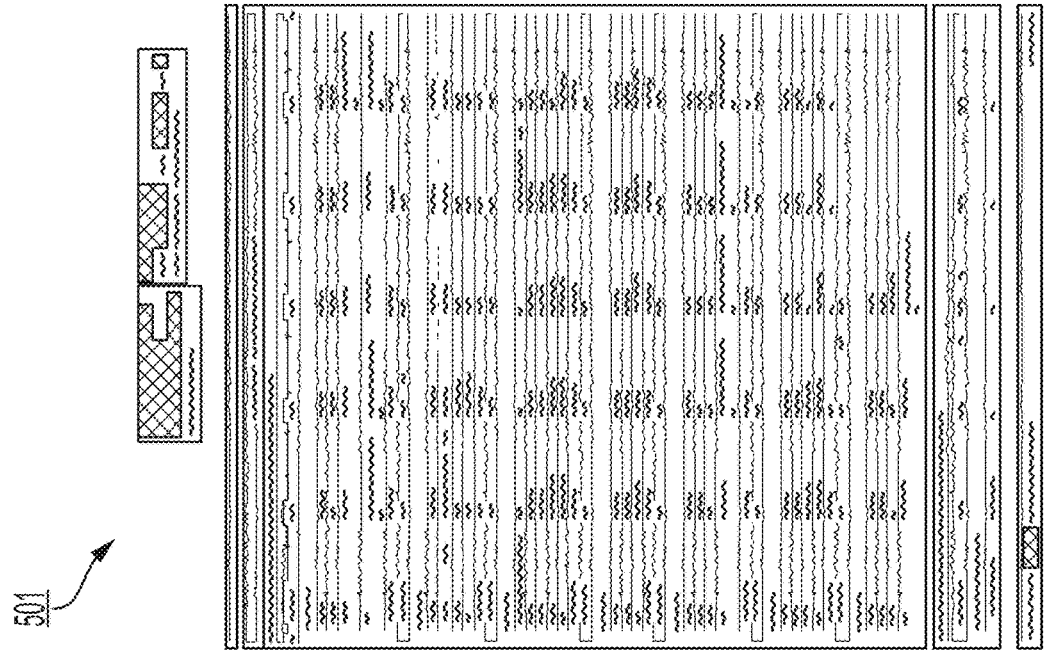
Figure 5B:
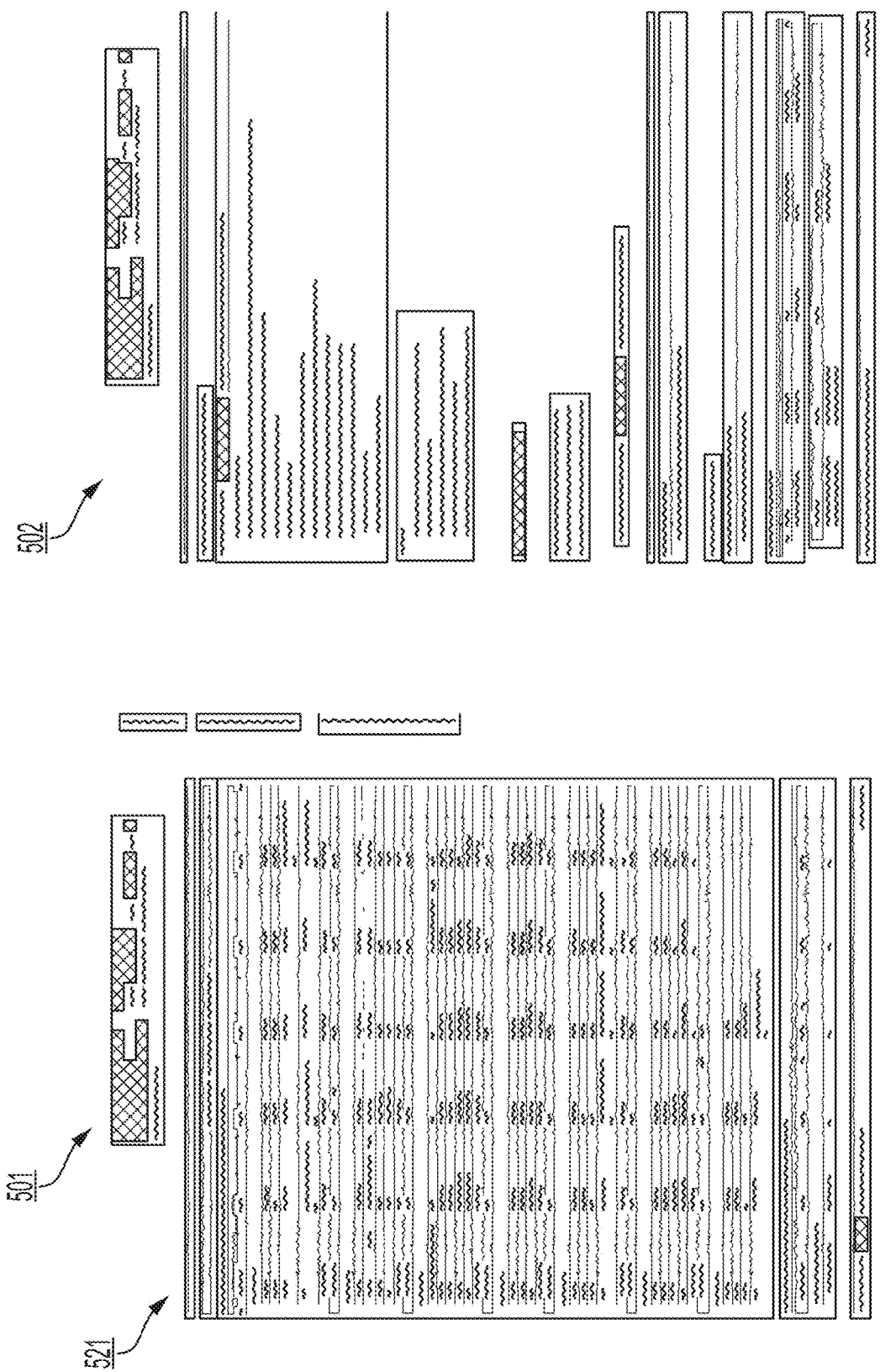
Figure 5C:
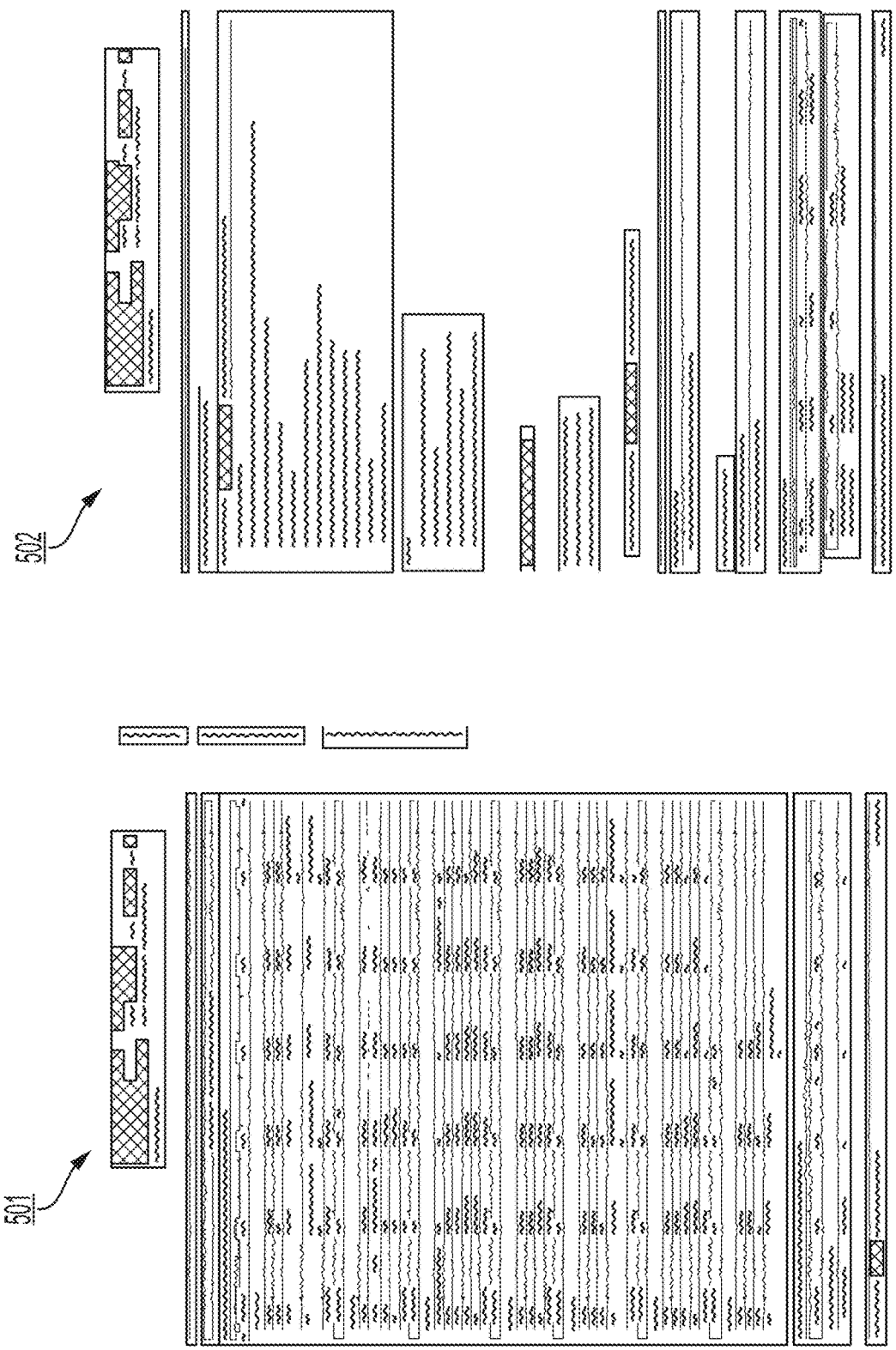

FIGS. 5A-5C provide operational examples of generating bounding boxes for two page images using distinct object differentiation kernels in accordance with some embodiments discussed herein.

Figure 6:
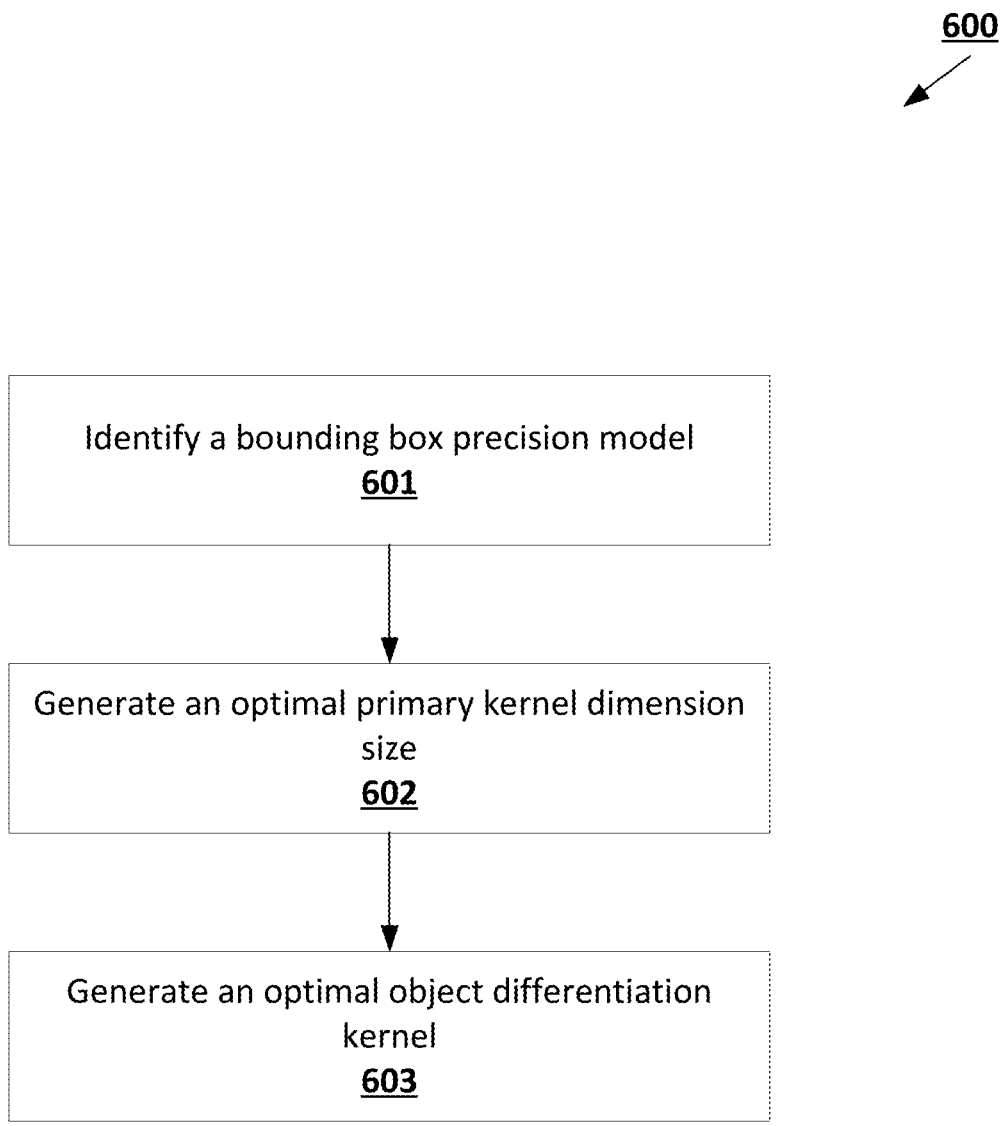

FIG. 6 is a flowchart diagram of an example process for generating an optimal object differentiation kernel for an image se in accordance with some embodiments discussed herein.

Figure 7:
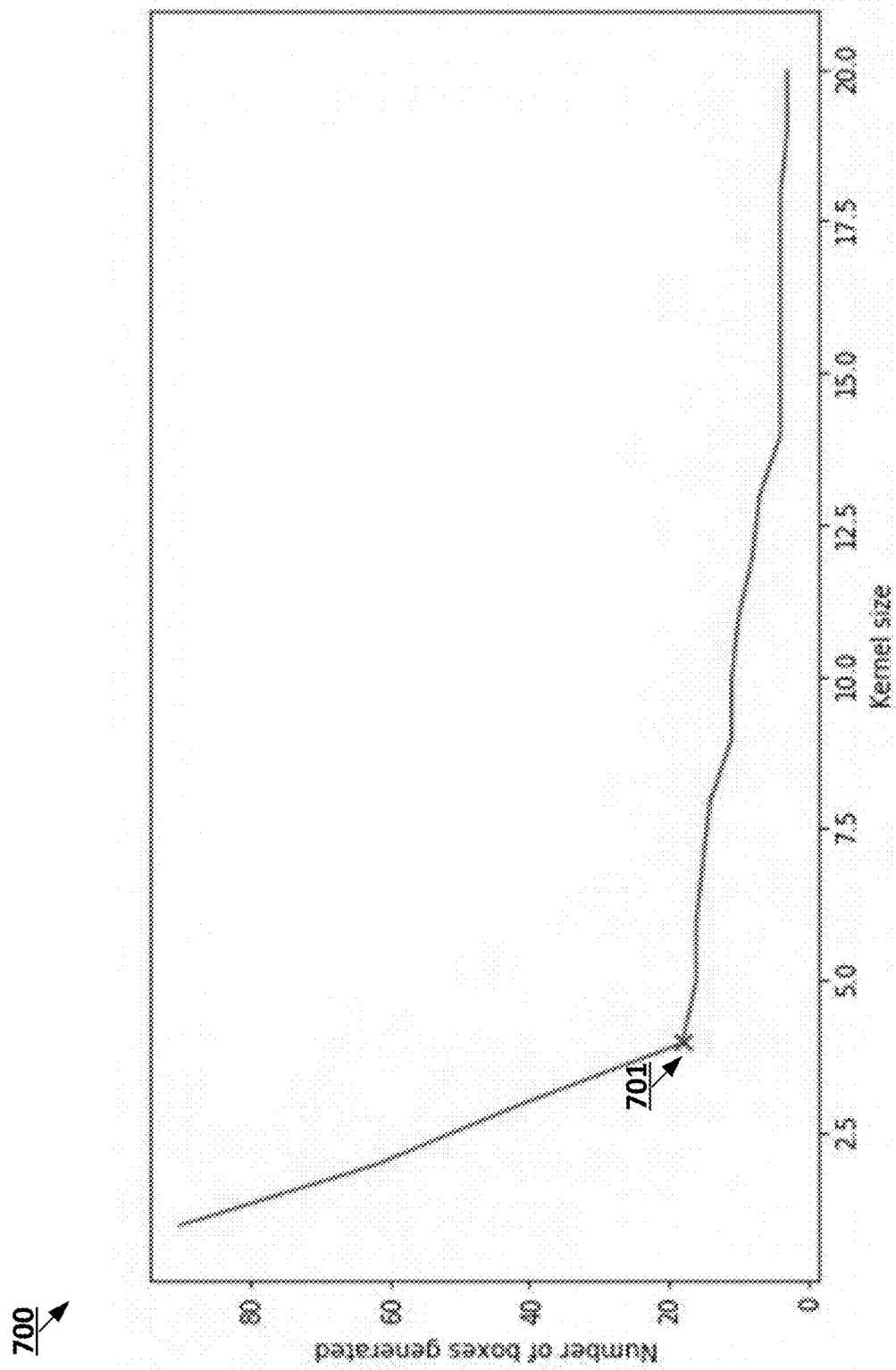

FIG. 7 provides an operational example of graph representation of a bounding box precision model in accordance with some embodiments discussed herein.

Figure 8:
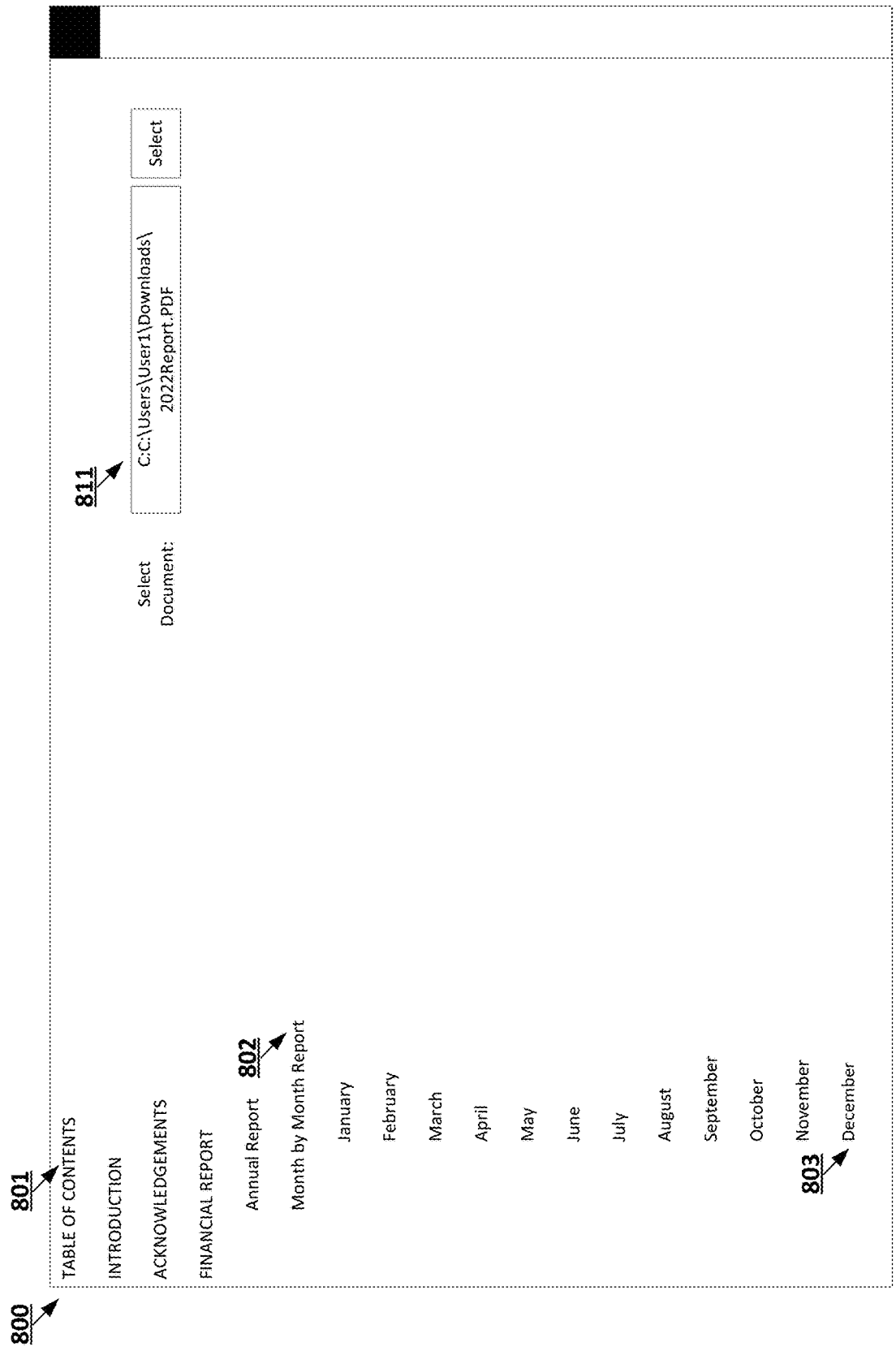

FIG. 8 provides an operational example of a prediction output user interface in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis tasks.

I. Overview and Exemplary Technical Improvements

Various embodiments of the present invention improve computational efficiency of performing segment-wise image classification on segments of images by introducing techniques for detecting optimal sizes for object differentiation kernels across image sets using optimizations performed in accordance with bounding box precision models. In some embodiments, given a bounding box precision model that relates primary kernel dimension sizes for an optimal object differentiation kernel to resulting bounding box counts, an optimal primary kernel dimension size for the object differentiation kernel can be computed with linear computational complexity or with less. This is a vast improvement over existing approaches for determining optimal image regions, such as sliding window approaches, that require performing various memory-intensive scans across entirety of input images in an image set. In this way, various embodiments of the present invention reduce the number of computer processor operations needed to perform segment-wise image classification on segments of images, improve computational complexity of performing segment-wise image classification on segments of images, and make important technical contributions to the fields of digital image processing and computer vision.

Various embodiments of the present invention introduce techniques for performing efficient and effective operational load balancing server systems that are configured to perform post-processing operations on documents associated with document image sets. For example, in some embodiments, a predictive data analysis computing entity determines D bounding box classifications for D bounding boxes of a document image set. Then, the count of bounding boxes that are associated with a particular bounding box classification, along with a resource utilization ratio for each bounding box, can be used to predict a predicted number of computing entities needed to perform post-prediction processing operations (e.g., automated document processing operations) with respect to the D bounding boxes. For example, in some embodiments, the number of computing entities needed to perform post-prediction processing operations (e.g., automated document processing operations) with respect to D bounding boxes can be determined based at least in part on the output of the equation: $R=\text{ceil}(\Sigma_k^{k=K} ur_k)$, where R is the predicted number of computing entities needed to perform post-prediction processing operations with respect to the D bounding boxes, cello) is a ceiling function that returns the closest integer that is greater than or equal to the value provided as the input parameter of the ceiling function, k is an index variable that iterates over K bounding boxes among the D bounding boxes that are associated with the particular bounding box classification, and $ur_k$ is the estimated resource utilization ratio for a kth bounding box that may be determined based at least in part on a size of the kth bounding box. In some embodiments, once R is generated, the predictive data analysis computing entity can use R to perform operational load balancing for a server system that is configured to perform post-prediction processing operations (e.g., automated document processing operations) with respect to the D bounding boxes. This may be done by allocating computing entities to the post-prediction processing operations if the number of currently-allocated computing entities is below R, and deallocating currently-allocated computing entities if the number of currently-allocated computing entities is above R.

An exemplary application of various embodiments of the present invention relates to identifying section headings within document images (e.g., pages of an image-based Portable Document Format (PDF) document). In some embodiments, an image-based classification system: (i) determines a set of n sampled image-based document pages from an image-based document to ensure that the sampled image-based document pages capture diverse layout formats associated with the image-based document format, and (ii) for each sampled image-based document page: (a) determines the kernel size associated with an elbow point (i.e., a sharp drop point) of a kernel-box relationship graph for the sampled image-based document, (b) generates bounding boxes based at least in part on the elbow point kernel size, and (c) generates a heading classification for each generated bounding box by using an image-based classification machine learning model.

In some embodiments, for each image-based document, a set of n image-based document pages is sampled from the image-based document pages of the image-based document, in a manner that is configured to ensure that the n sampled image-based document images represent various document layout formats present across the image-based document pages of the image-based document. In some embodiments, for each sampled image-based document page, a kernel-box relationship graph describing the relationship between proposed kernel sizes for the sampled image-based document page and the number of resulting bounding boxes generated using various proposed kernel sizes is generated. In some embodiments, for each sampled image-based document page, the "elbow point" of the kernel-box relationship graph for the sampled image-based document page that represents a proposed kernel size after which a sharp drop in the number of resulting bounding boxes occurs is identified. In some embodiments, for each sampled image-based document page, the proposed kernel size corresponding to the "elbow point" associated with the sampled image-based document page is used to generate various bounding boxes of the sampled image-based document page as well as to extract image-based features from each bounding box of a sampled image-based document page. In some embodiments, the image-based features for each bounding box of a sampled image-based document page are used as input data for an image-based classification machine learning model to generate a heading classification for the bounding box of the sampled image-based document page. The heading classification of a bounding box may describe an inferred/predicted likelihood that the bounding box describes a heading (or other desired document element, such as a graph, a logo, and/or the like).

II. Definitions

The term "bounding box" may refer to a data construct that describes feature data associated with a region of an image in an image set, where the region is determined based at least in part on a non-whitespace region of the image that is separated from other non-whitespace regions by threshold-satisfying distances defined by an object differentiation kernel for the image set. For example, consider an example in which a document image set contains only one document image that is an image representation of a document page that contains only two sentences: "I am going to school. The school is so far away." In this example, if the horizontal distance between two words is 2 distance units while the horizontal distance between two sentences is 4 distance units, then an object differentiation kernel that is associated with a horizontal dimension size of three may detect two bounding boxes: one bounding box capturing the image region associated with the first sentence, and the other bounding box capturing the image region associated with the second sentence. However, an object differentiation kernel that is associated with a horizontal distance of five may detect only one bounding box capturing the image region associated with both sentences.

The term "object differentiation kernel" may refer to a data construct that describes a two-dimensional area, where two contiguous non-whitespace portions of an image are deemed to be belong to two distinct bounding boxes if they are separated from one another by an area that is equal to or larger than the two-dimensional area described by the object differentiation kernel. In some embodiments, to generate bounding boxes for an image, image content is scanned from a starting portion (e.g., a starting pixel, such as the uppermost left-most pixel) and in accordance with a defined scanning direction policy (e.g., first from left to right across a row of pixels, and then downward starting from the rightmost pixel of the lower row). In some of the noted embodiments, during the noted image scanning, detection of whitespace content of an image in an area that is equal to or larger than the two-dimensional area described by the applicable object differentiation kernel will cause a predictive data analysis system to categorize any non-whitespace portion of the image that is positioned (in accordance with the scanning direction policy defined above) before the two-dimensional area and has not already been assigned to a bounding box as part of a new bounding box. Thus, in some embodiments, an object differentiation kernel is associated with a two-dimensional area, where the two-dimensional area is associated with a horizontal dimension and a vertical dimension. In some embodiments, configuration data associated with an image set (e.g., a document image set) may describe one of the two noted dimension as the primary dimension and another of the two noted dimensions as the secondary dimension (where the primary dimension may be the dimension of the object differentiation kernel that is first automatically tuned in accordance with techniques described herein, while the secondary dimension may be the dimension that is either not automatically tuned at all or is tuned after the primary dimension and based at least in part on the optimal primary kernel dimension size for the primary dimension).

The term "image classification machine learning model" may refer to a data construct that describes parameters, hyperparameters, and/or defined operations of a machine learning model that is configured to generate an image format classification for an input image. In some embodiments, generating image format categories for a multi-image image set comprises providing each image in the multi-image image set to an image format classification machine learning model in order to generate a predicted image format for the image, and then aggregating all of the images having a shared predicted image format into a corresponding image format category. The image format classification machine learning model may be configured to process feature data associated with an image in order to generate a predicted image format for the image. Examples of feature data processed by the image format classification machine learning model may include whitespace portion ratio of an image, brightness of the image, average length of contiguous non-whitespace portions of the image, an embedded representation of the image title, and/or the like. In some embodiments, the image format classification machine learning model is a clustering machine learning model that is configured to cluster N images of a multi-image image set into F clusters (e.g., where F may be a hyperparameter of the clustering machine learning model) and assign each cluster to an image format. In some of the noted embodiments, the predicted image format for the image may be determined based at least in part on the assigned cluster for the image. In some embodiments, the image format classification machine learning model is a supervised classification machine learning model that is configured to generate F classification scores for an image, each classification score describing a predicted likelihood that the image belongs to a respective image format of F image formats, where the image may be assigned to the image format having the largest classification score. In some embodiments, the image format classification score is trained using ground-truth format labels generated by subject matter experts and/or based at least in part on historical user interactions (e.g., page images whose access rate by users associated with a team satisfies an access ratio may be labeled as being associated with an image format that is associated with the team, such as an accounting page image format for page images accessed by accounting team users with sufficient access ratio). In some embodiments, inputs to the image format classification machine learning model comprise a feature vector for an input image, while outputs of the image classification machine learning comprise at least one of: (i) a vector and/or an atomic value describing the predicted image format of the input image, or (ii) a vector describing the F classification scores of the input image.

The term "bounding box precision model" may refer to a data construct that describes, for each candidate primary kernel dimension size in a primary kernel dimension size range (which may be a continuous range or a discrete range), a resulting bounding box count when non-white areas of the image set are differentiated in accordance with a candidate object differentiation kernel whose primary kernel dimension size is determined based at least in part on the candidate primary kernel dimension size and whose secondary kernel dimension size is determined based at least in part on a predetermined secondary kernel dimension size. In some embodiments, given a defined primary dimension (e.g., the vertical dimension), a defined secondary dimension (e.g., the horizontal dimension), a predetermined secondary kernel dimension size (e.g., a horizontal dimension size of 15), and a primary kernel dimension size range (e.g., the kernel dimension size range of [1, 20]), a predictive data analysis computing entity may scan/modify the primary kernel dimension size across the primary kernel dimension size range and, for each given primary kernel dimension size, determine the number of bounding boxes across all of the image set (i.e., the resulting bounding box count) that are generated using an object differentiation kernel whose primary kernel dimension size is equal to the given primary kernel dimension size and whose secondary kernel dimension size is equal to the predetermined secondary kernel dimension size. The corresponding relationship between the primary kernel dimension sizes and the resulting bounding box counts, which is expected to be a negative relationship as the number of generated bounding boxes decreases with increasing object differentiation kernel areas, may then be captured by the bounding box precision model. For example, consider an exemplary embodiment in which the primary dimension is the vertical dimension, the secondary dimension is the horizontal dimension, the predetermined secondary kernel dimension size is a horizontal dimension size of 15, and the horizontal kernel dimension size range is [1, 20], then the predictive data analysis computing entity may determine resulting bounding box counts generated using the object differentiation kernels <15, i>, where i iterates over [1, 20], and then capture the resulting relationship between i and the resulting bounding box counts as the bounding box precision model.

The term "optimal primary kernel dimension size" may refer to a data construct that describes a candidate primary dimension size for a primary dimension that is estimated to be associated with steepest decline (e.g., most downward instantaneous rate of change) as determined based at least in part on the relationship between candidate primary kernel dimension sizes and resulting bounding box counts that is described by a bounding box precision model. In some embodiments, the optimal primary kernel dimension size is a candidate primary kernel dimension size that is deemed to be associated with the "elbow point" of a graph representation of the bounding box precision model. For example, as depicted in FIG. 7, the elbow point of the graph representation 700 is the point 701, which is associated with the candidate horizontal dimension size of 4. Exemplary techniques for automatically detecting an elbow point of a graph relationship include, in addition to the techniques described below, the Kneedle algorithm (aspects of which are described in Stropaa et al., *Finding a "Kneedle" in a Haystack: Detecting Knee Points in System Behavior*, 31st International Conference on Distributed Computing Systems Workshops (2011), available online at https://ragha-van.usc.edu/papers/kneedle-simplex11.pdf, techniques including central difference tests for discrete ranges, and/or the like.

The term "bounding box classification" may refer to a data construct that describes a predicted category/class for a particular bounding box. For example, the bounding box classification for a particular bounding box may describe a predicted likelihood that the particular bounding box depicts a visual representation of a target element of the underlying document (e.g., a heading of the underlying document, an Lth level heading of the underlying document, such as a first-level heading of the underlying document). As another example, the bounding box classification for a particular bounding box may describe a section type of a section of the underlying document that corresponds to the particular bounding box. For example, the bounding box classification for a particular bounding box may describe the layout element associated with the particular bounding box (e.g., whether the particular bounding box depicts a page segment corresponding to a form, a table of connects, a heading, and/or the like).

The term "bounding box classification machine learning model" may refer to a data construct that describes parameters, hyperparameters, and/or defined operations of a machine learning model that is configured to generate a bounding box classification for a bounding box of an image. In some embodiments, the bounding box classification machine learning model is configured to generate a convolutional representation of the bounding box (e.g., using one or more two-dimensional convolutional neural network layers) and process the convolutional representation (e.g., using one or more trained feedforward neural network layers, such as using one or more trained feedforward fully connected neural network layers). In some embodiments, inputs to the bounding box classification machine learning model comprise a matrix/two-dimensional array describing region/pixel values for an input bounding box. In some embodiments, outputs of the bounding box classification machine learning model comprise a vector describing, for each classification of two or more classifications associated with the bounding box classification machine learning model (e.g., a classification associated with heading-related bounding boxes and a classification associated with non-heading-related bounding boxes), a classification score, where the bounding box classification of the input bounding box is determined based at least in part on the class having the highest classification score. In some embodiments, outputs of the bounding box classification machine learning model comprise a vector and/or an atomic value describing the bounding box classification for the input bounding box. In some embodiments, the bounding box classification machine learning model is trained using ground-truth bounding box classification labels for a set of bounding boxes, for example ground-truth bounding box classification labels generated by subject matter experts and/or generated based at least in part on historical data determining headings for documents based at least in part on user interactions with the headings. In some embodiments, the bounding box classification machine learning model is configured to process feature data associated with a bounding box of an image to generate a bounding box classification for the bounding box. Examples of feature data for a bounding box include coordinates of the bounding box, indentation of the bounding box, pixel density of the bounding box. In some embodiments, inputs to the bounding box classification machine learning model include a feature vector describing features of an input bounding box.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a scripting language, a database query or search language, and/or a report writing language. In one or more example embodiments, a software component comprising instructions in one of the foregoing examples of programming languages may be executed directly by an operating system or other software components without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid-state card (SSC), solid-state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read-only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises a combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions. An example of a prediction-based action that can be performed using the predictive data analysis system 101 is generating an inferred/predicted layout of an underlying document that is associated with a document image set.

In some embodiments, the predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in several different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application-specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

As described below, various embodiments of the present invention improve computational efficiency of performing segment-wise image classification on segments of images by introducing techniques for detecting optimal sizes for object differentiation kernels across image sets using optimizations performed in accordance with bounding box precision models. In some embodiments, given a bounding box precision model that relates primary kernel dimension sizes for an optimal object differentiation kernel to resulting bounding box counts, an optimal primary kernel dimension size for the object differentiation kernel can be computed with linear computational complexity or with less. This is a vast improvement over existing approaches for determining optimal image regions, such as sliding window approaches, that require performing various memory-intensive scans across entirety of input images in an image set. In this way, various embodiments of the present invention reduce the number of computer processor operations needed to perform segment-wise image classification on segments of images, improve computational complexity of performing segment-wise image classification on segments of images, and make important technical contributions to the fields of digital image processing and computer vision.

FIG. 4 is a flowchart diagram of an example process 400 for performing image-based processing on a document image set that comprises a set of document images. Via the various steps/operations of the process 400, the predictive data analysis computing entity 106 can use an optimal object differentiation kernel to generate optimal bounding boxes of the document image set that can then be used to generate bounding box classifications that are configured to enable performing target section detection (e.g., heading detection) with respect to the underlying document. However, while various embodiments of the present invention are described with reference to performing image classification with respect to bounding boxes of a document image set, a person of ordinary skill in the relevant technology will recognize that the disclosed techniques can be used to perform image classification with respect to bounding boxes of any image set.

The process 400 begins at step/operation 401 when the predictive data analysis computing entity 106 identifies (e.g., receives) the document image set. In some embodiments, the document image set is associated with an underlying document having N pages, and each document image in the document image set is an image representation of a page of the N pages in the underlying document. Accordingly, each document image in the document image may be a page image that is an image representation of a page of the N pages of the underlying document. In some embodiments, the page images of a document image set are determined based at least in part on the output of a scanning device. For example, an end user may scan pages of a real-world document using the scanning device, and the resulting images may be the page images of a document image set.

At step/operation 402, the predictive data analysis computing entity 106 generates one or more optimal bounding boxes based at least in part on the document image set. Each bounding box may describe a region of a document image in the document image set, where the region is determined based at least in part on a non-whitespace region of a document image that is separated from other non-whitespace regions by threshold-satisfying distances defined by an object differentiation kernel for the document image set.

For example, consider an example in which a document image set contains only one document image that is an image representation of a document page that contains only two sentences: "I am going to school. The school is so far away." In this example, if the horizontal distance between two words is 2 distance units while the horizontal distance between two sentences is 4 distance units, then an object differentiation kernel that is associated with a horizontal dimension size of three may detect two bounding boxes: one bounding box capturing the image region associated with the first sentence, and the other bounding box capturing the image region associated with the second sentence. However, an object differentiation kernel that is associated with a horizontal distance of five may detect only one bounding box capturing the image region associated with both sentences.

As the above-noted example illustrates, the object differentiation kernel used to generate bounding boxes of the document image set can define the granularity with which non-whitespace content of the document image set can be differentiated into non-whitespace content units associated with bounding boxes. For example, an overly small object differentiation kernel may cause detection of an excessively large number of bounding boxes, an approach that may fail to capture the structure of the document images with desired granularity (e.g., if the objective is to detect image regions corresponding to words, the system may instead detect image regions corresponding to characters). As another example, an overly small object differentiation kernel may cause detection of an excessively small number of bounding boxes, an approach that also fails to capture the structure of the document images with desired granularity (e.g., if the objective is to detect images regions corresponding to words, the system may instead detect image regions corresponding to sentences).

Accordingly, an object differentiation kernel may describe a two-dimensional area, where two contiguous non-whitespace portions of an image are deemed to be belong to two distinct bounding boxes if they are separated from one another by an area that is equal to or larger than the two-dimensional area described by the object differentiation kernel. In some embodiments, to generate bounding boxes for an image, image content is scanned from a starting portion (e.g., a starting pixel, such as the upper-most left-most pixel) and in accordance with a defined scanning direction policy (e.g., first from left to right across a row of pixels, and then downward starting from the rightmost pixel of the lower row). In some of the noted embodiments, during the noted image scanning, detection of whitespace content of an image in an area that is equal to or larger than the two-dimensional area described by the applicable object differentiation kernel will cause a predictive data analysis system to categorize any non-whitespace portion of the image that is positioned (in accordance with the scanning direction policy defined above) before the two-dimensional area and has not already been assigned to a bounding box as part of a new bounding box.

Thus, in some embodiments, an object differentiation kernel is associated with a two-dimensional area, where the two-dimensional area is associated with a horizontal dimension and a vertical dimension. In some embodiments, configuration data associated with an image set (e.g., a document image set) may describe one of the two noted dimension as the primary dimension and another of the two noted dimensions as the secondary dimension (where the primary dimension may be the dimension of the object differentiation kernel that is first automatically tuned in accordance with techniques described herein, while the secondary dimension may be the dimension that is either not automatically tuned at all or is tuned after the primary dimension and based at least in part on the optimal primary kernel dimension size for the primary dimension). In some embodiments, each dimension of an object differentiation kernel may be associated with a respective kernel dimension size that describes the magnitude/distance of the dimension in terms of any applicable distance units. For example, if the horizontal dimension of an object differentiation kernel is 15 distance units long while the vertical dimension of the object differentiation kernel is 2 distance units long, then this object differentiation kernel may be represented as <15, 2>, the kernel dimension size for the horizontal dimension (aka. the horizontal kernel dimension size) of the object differentiation kernel may be 15, and the kernel dimension size for the vertical dimension (aka. the vertical kernel dimension size) of the object differentiation kernel may be 2.

As described above, the object differentiation kernel used for performing bounding box generation with respect to an image can affect the number of bounding boxes generated after scanning the image. For example, FIG. 5A depicts the bounding boxes generated for a first image 501 and a second image 502 using a <15, 2> object differentiation kernel. In this example, if the objective of bounding box generation is to detect sections of the two pages, then the utilized object differentiation kernel seems to have accomplished this task with respect to the first image 501, but not with respect to the second image 502. This is because, in the second image 502, the bounding boxes seem to correspond to lines rather than sections. This may result from the utilized object differentiation kernel being overly small when used for an image set including both the first image 501 and the second image 502.

As another example, FIG. 5B depicts the bounding boxes generated for a first image 501 and a second image 502 using a <15, 5> object differentiation kernel. In this example, if the objective of bounding box generation is to detect sections of the two pages, then the utilized object differentiation kernel seems to have accomplished this task with respect to the second image 502, but not with respect to the first image 501. This is because, for example, the bounding box 521 is excessively large and includes image portions associated with two sections of the first image 501. This may result from the utilized object differentiation kernel being overly large for an image set comprising the first image 501 and the second image 502.

As yet another example, FIG. 5C depicts the bounding boxes generated for a first image 501 and a second image 502 using a <15, 5> object differentiation kernel. In this example, if the objective of bounding box generation is to detect sections of the two pages, then the utilized object differentiation kernel seems to have accomplished this task with respect to both the first image 501 and the second image 502. This may result from the utilized object differentiation kernel having an appropriate size for an image set comprising the first image 501 and the second image 502.

As the examples depicted in FIGS. 5A-5C illustrate, using a common object differentiation kernel for an image set comprising two or more images presents unique challenges, as some of the object differentiation kernels that achieve desired granularity for a first subset of the image set may not achieve the desired granularity for a second subset of the image set. Nevertheless, if a common object differentiation kernel that is effective and reliable for an image set is detected, this avoids the need for performing individual image processing (e.g., individual image classification) on individual images of the image set, thus increasing computational efficiency of an overall image processing operation with respect to a multi-image image set (i.e., an image set including two or more images). Accordingly, various embodiments of the present invention relate to detecting an optimal object differentiation kernel for all of an image set, such as for all page images of a document image set. However, other embodiments of the present invention relate to detecting optimal object differentiation kernels for individual images (e.g., individual page images) or for all images in an image category (e.g., for all page images having a particular page format category).

Examples of approaches for generating optimal object differentiation kernels for a multi-image image set (e.g., a document image set with two or more page images) is described herein. In some embodiments, a multi-image image set is associated with a sampling ratio R, which may be a value between 0 and 1. In some embodiments, given a multi-image image set that includes N images, S of the N images are sampled, where S is generated based at least in part on the output of R*N. In some embodiments, sampling S images from the N images is performed randomly (e.g., in a pseudo-random fashion). In some embodiments, given F image formats (e.g., given F page formats), the N images are divided into F image format categories denoted as $C_1 \ldots C_F$, with each image format category including a subset of the N images having a shared image format. In some embodiments, sampling S images from the N images is performed by randomly sampling from the F image format categories. In some embodiments, each image format category $C_i$ is associated with an image ratio $O_i$ that describes a share of the N images that are in the image format category. In some embodiments, sampling S images from the N images is performed by randomly sampling $O_i$ images from each ith image format category. After sampling the S images, then an optimal object differentiation kernel may be generated for an image set comprising all of the S images. Once generated, the optimal object differentiation kernel may be used for all of the N images, despite being generated based at least in part on a sampled subset of the N images.

In some embodiments, given a multi-image image set that includes N images, the N images are divided into F image format categories. For example, given a document image set that includes N page images, the N page images may be divided into F page format categories. Then, for each image format category, a separate optimal object differentiation kernel is determined (e.g., based at least in part on a bounding box precision model that is determined based at least in part on all of the images in the image format category or based at least in part on a sampled subset of the image format category, where the sampled subset may be generated using the techniques described in the preceding paragraph but for an image format category rather than for all of a multi-image image set comprising F image format categories). Once generated, the optimal object differentiation kernel for an image format category can be used to perform bounding box generation for all of the images in the image format category.

In some embodiments, generating image format categories for a multi-image image set comprises providing each image in the multi-image image set to an image format classification machine learning model in order to generate a predicted image format for the image, and then aggregating all of the images having a shared predicted image format into a corresponding image format category. The image format classification machine learning model may be configured to process feature data associated with an image in order to generate a predicted image format for the image. Examples of feature data processed by the image format classification machine learning model may include whitespace portion ratio of an image, brightness of the image, average length of contiguous non-whitespace portions of the image, an embedded representation of the image title, and/or the like.

In some embodiments, the image format classification machine learning model is a clustering machine learning model that is configured to cluster N images of a multi-image image set into F clusters (e.g., where F may be a hyperparameter of the clustering machine learning model) and assign each cluster to an image format. In some of the noted embodiments, the predicted image format for the image may be determined based at least in part on the assigned cluster for the image. In some embodiments, the image format classification machine learning model is a supervised classification machine learning model that is configured to generate F classification scores for an image, each classification score describing a predicted likelihood that the image belongs to a respective image format of F image formats, where the image may be assigned to the image format having the largest classification score. In some embodiments, the image format classification score is trained using ground-truth format labels generated by subject matter experts and/or based at least in part on historical user interactions (e.g., page images whose access rate by users associated with a team satisfies an access ratio may be labeled as being associated with an image format that is associated with the team, such as an accounting page image format for page images accessed by accounting team users with sufficient access ratio). In some embodiments, inputs to the image format classification machine learning model comprise a feature vector for an input image, while outputs of the image classification machine learning comprise at least one of: (i) a vector and/or an atomic value describing the predicted image format of the input image, or (ii) a vector describing the F classification scores of the input image.

In some embodiments, given a multi-image image set that comprises N images, a separate optimal object differentiation kernel is generated for each of the N images, and thus N optimal differentiation kernels are generated. Once generated, performing bounding box generation with respect to each image is performed using the separate optimal bounding box for that page.

Accordingly, generating bounding boxes for an image set comprises generating at least one optimal object differentiation kernel for the image set. FIG. 6 is a flowchart diagram of an exemplary process 600 for generating an optimal object differentiation kernel for an image set. As the discussion above suggests, the image set used to generate the optimal object differentiation kernel may be all of an underlying image set (e.g., all of an underlying document image set including all page images of pages of a corresponding document), a sampled subset of an underlying image set of an underlying image set comprising a group of images, all of an image format category of an underlying image set comprising a group of images, a sampled subset of an image format category of an underlying image set comprising a group of images, one image of an underlying image set comprising a group of images, and/or the like.

For example, in some embodiments, the process 600 may be performed with respect to a sampled subset of a document image set. As another example, given a document image set of N page images, the process 600 may be performed once for each page image, and thus the process 600 may be performed N times. As yet another example, given a document image set of F page image format categories, the process 600 may be performed once for each page image format category, and thus the process 600 may be performed F times.

The process 600 begins at step/operation 601 when the predictive data analysis computing entity 106 identifies a bounding box precision model for the image set. The bounding box precision model may describe, for each candidate primary kernel dimension size in a primary kernel dimension size range (which may be a continuous range or a discrete range), a resulting bounding box count when non-white areas of the image set are differentiated in accordance with a candidate object differentiation kernel whose primary kernel dimension size is determined based at least in part on the candidate primary kernel dimension size and whose secondary kernel dimension size is determined based at least in part on a predetermined secondary kernel dimension size. In some embodiments, given a defined primary dimension (e.g., the vertical dimension), a defined secondary dimension (e.g., the horizontal dimension), a predetermined secondary kernel dimension size (e.g., a horizontal dimension size of 15), and a primary kernel dimension size range (e.g., the kernel dimension size range of [1, 20]), the predictive data analysis computing entity 106 may scan/modify the primary kernel dimension size across the primary kernel dimension size range and, for each given primary kernel dimension size, determine the number of bounding boxes across all of the image set (i.e., the resulting bounding box count) that are generated using an object differentiation kernel whose primary kernel dimension size is equal to the given primary kernel dimension size and whose secondary kernel dimension size is equal to the predetermined secondary kernel dimension size. The corresponding relationship between the primary kernel dimension sizes and the resulting bounding box counts, which is expected to be a negative relationship as the number of generated bounding boxes decreases with increasing object differentiation kernel areas, may then be captured by the bounding box precision model.

For example, consider an exemplary embodiment in which the primary dimension is the vertical dimension, the secondary dimension is the horizontal dimension, the predetermined secondary kernel dimension size is a horizontal dimension size of 15, and the horizontal kernel dimension size range is [1, 20], then the predictive data analysis computing entity 106 may determine resulting bounding box counts generated using the object differentiation kernels <15, i>, where i iterates over [1, 20], and then capture the resulting relationship between i and the resulting bounding box counts as the bounding box precision model.

An operational example of a graph representation 700 of a bounding box precision model is depicted in FIG. 7. As depicted in FIG. 7, the bounding box precision model is a relationship between primary kernel dimension sizes (represented by the vertical dimension sizes) as represented by the horizontal axis and the resulting bounding box count as represented by the vertical axis. Note that the resulting bounding box count for a given primary kernel size dimension may be determined based at least in part on a count of resulting bounding boxes across all of the images in an image set, and not on a per-image basis if the image set is a multi-image image set.

Returning to FIG. 6, at step/operation 602, the predictive data analysis computing entity 106 generates an optimal primary kernel dimension size based at least in part on the bounding box precision model. In some embodiments, the optimal primary kernel dimension size is a candidate primary dimension size that is estimated to be associated with steepest decline (e.g., most downward instantaneous rate of change) as determined based at least in part on the relationship between candidate primary kernel dimension sizes and resulting bounding box counts that is described by the bounding box precision model. In some embodiments, the optimal primary kernel dimension size is a candidate primary kernel dimension size that is deemed to be associated with the "elbow point" of a graph representation of the bounding box precision model. For example, as depicted in FIG. 7, the elbow point of the graph representation 700 is the point 701, which is associated with the candidate horizontal dimension size of 4.

Exemplary techniques for automatically detecting an elbow point of a graph relationship include, in addition to the techniques described below, the Kneedle algorithm (aspects of which are described in Stropaa et al., *Finding a "Kneedle" in a Haystack: Detecting Knee Points in System Behavior*, 31st International Conference on Distributed Computing Systems Workshops (2011), available online at https://raghavan.usc.edu/papers/kneedle-simplex11.pdf, techniques including central difference tests for discrete ranges, and/or the like.

In some embodiments, generating the optimal primary kernel dimension size includes generating a derivative measure for each candidate primary kernel dimension size in accordance with the bounding box precision model and selecting the candidate primary kernel dimension size having the lowest derivative measure as the optimal primary kernel dimension size. In other words, estimating the steepest decline of the bounding box precision model includes generating the derivative function of the function defined by the bounding box precision model and selecting the minimum point of the derivative function as the steepest decline point. In some embodiments, generating the optimal primary kernel dimension size includes performing an iterative derivative determination routine comprising, for each candidate primary kernel dimension size in the primary dimension size range starting from a smallest candidate kernel dimension size, in response to determining that a derivative measure for the candidate primary kernel dimension size fails to satisfy (e.g., falls below) a derivative threshold, adopting the candidate primary kernel dimension size as the optimal primary kernel size measure and terminating the iterative derivative determination routine. In other words, the first candidate primary dimension size that has a sufficiently low derivative is adopted as the steepest point of the bounding box precision model.

At step/operation 603, the predictive data analysis computing entity 106 generates the optimal object differentiation kernel based at least in part on the optimal primary kernel dimension size. In some embodiments, the primary kernel dimension size of the optimal object differentiation kernel is set equal to the optimal primary kernel dimension size. In some embodiments, the secondary kernel dimension size of the optimal object differentiation kernel is set equal to a predetermined secondary kernel dimension size (e.g., a secondary kernel predetermined dimension size of 15).

In some embodiments, the secondary kernel dimension size of the optimal object differentiation kernel is determined using a secondary bounding box model that may describe, for each candidate secondary kernel dimension size (e.g., a horizontal dimension size) in a secondary kernel dimension size range (e.g., a secondary kernel dimension size of [1, 20]), a resulting bounding box count when non-white areas of the image set are differentiated in accordance with a candidate object differentiation kernel whose primary kernel dimension size is determined based at least in part on the optimal kernel dimension size (e.g., as generated in accordance with the techniques described above) and whose secondary kernel dimension size is determined based at least in part on the candidate secondary kernel dimension size. For example, consider an exemplary embodiment in which the primary dimension is the vertical dimension, the secondary dimension is the horizontal dimension, the optimal primary kernel dimension size is a vertical dimension size of 4, and the horizontal dimension size range is [1, 20], then the predictive data analysis computing entity 106 may determine resulting bounding box counts generated using the object differentiation kernels <j, 4>, where j iterates over [1, 20], and then capture the resulting relationship between j and the resulting bounding box counts as the secondary bounding box precision model.

In some embodiments, the predictive data analysis computing entity 106 generates an optimal secondary dimension size based at least in part on the secondary bounding box precision model. In some embodiments, the optimal secondary dimension size is a candidate secondary kernel dimension size that is estimated to be associated with steepest decline (e.g., most downward instantaneous rate of change) as determined based at least in part on the relationship between candidate secondary kernel dimension sizes and resulting bounding box counts that is described by the secondary bounding box precision model. In some embodiments, the optimal secondary kernel dimension size is a candidate secondary kernel dimension size that is deemed to be associated with the "elbow point" of a graph representation of the secondary bounding box precision model. Exemplary techniques for automatically detecting an elbow point of a graph relationship include, in addition to the techniques described below, the Kneedle algorithm (aspects of which are described in Stropaa et al., *Finding a "Kneedle" in a Haystack: Detecting Knee Points in System Behavior*, 31st International Conference on Distributed Computing Systems Workshops (2011), available online at https://raghavan.usc.edu/papers/kneedle-simplex11.pdf, techniques including central difference tests for discrete ranges, and/or the like.

In some embodiments, generating the optimal secondary kernel dimension size includes generating a derivative measure for each candidate secondary kernel dimension size in accordance with the secondary bounding box precision model and selecting the candidate secondary kernel dimension size having the lowest derivative measure as the optimal secondary kernel dimension size. In other words, estimating the steepest decline of the secondary bounding box precision model includes generating the derivative function of the function defined by the secondary bounding box precision model and selecting the minimum point of the derivative function as the steepest decline point. In some embodiments, generating the optimal secondary kernel dimension size includes performing an iterative derivative determination routine comprising, for each candidate secondary kernel dimension size in the secondary dimension size range starting from a smallest candidate secondary kernel dimension size, in response to determining that a derivative measure for the candidate secondary kernel dimension size fails to satisfy (e.g., falls below) a derivative threshold, adopting the candidate secondary kernel dimension size as the optimal secondary kernel size measure and terminating the iterative derivative determination routine. In other words, the first candidate secondary dimension size that has a sufficiently low derivative is adopted as the steepest point of the secondary bounding box precision model.

Returning to FIG. 4, at step/operation 402, the predictive data analysis computing entity 106 may generate a set of optimal bounding boxes based at least in part on processing the document image set in accordance with the optimal object differentiation kernel. While various embodiments of the present invention describe embodiments in which all of the document image set (or an image set generally) is associated with a single optimal object differentiation kernel, a person of ordinary skill in the relevant technology will recognize that the disclosed techniques can be extended to process different page images (or different images generally) of a document image set using different optimal object differentiation kernel. In general, in some embodiments, to generate a set of optimal bounding boxes for a document image set (or for an image set generally), each page image (or each image generally) of the document image set is processed in accordance with an optimal object differentiation kernel for the page image (which may be specific to the page image, may be common across a subset of the page images of the document image set, or may be common across all of the page images of the document image set) to generate an optimal bounding box set for the page image, and then the optimal bounding box sets are aggregated across the page images to generate the set of optimal bounding boxes for the document image set.

As describe above, because the optimal object differentiation kernel is an object differentiation kernel, the optimal object differentiation kernel may describe a two-dimensional area, where two contiguous non-whitespace portions of a page image in the document image set are deemed to be belong to two distinct bounding boxes if they are separated from one another by an area that is equal to or larger than the two-dimensional area described by the object differentiation kernel. In some embodiments, to generate bounding boxes for a page image, image content is scanned from a starting portion (e.g., a starting pixel, such as the upper-most left-most pixel) and in accordance with a defined scanning direction policy (e.g., first from left to right across a row of pixels, and then downward starting from the rightmost pixel of the lower row). In some of the noted embodiments, during the noted image scanning, detection of whitespace content of a page image in an area that is equal to or larger than the two-dimensional area described by the optimal object differentiation kernel will cause a predictive data analysis system to categorize any non-whitespace portion of the image that is positioned (in accordance with the scanning direction policy defined above) before the two-dimensional area and has not already been assigned to a bounding box as part of a new bounding box.

At step/operation 403, the predictive data analysis computing entity 106 generates, for each optimal bounding box generated at step/operation 403, a bounding box classification that describes a predicted category/class for the optimal bounding box. In some embodiments, the bounding box classification for a particular bounding box describes a predicted category/class for the particular bounding box. For example, the bounding box classification for a particular bounding box may describe a predicted likelihood that the particular bounding box depicts a visual representation of a target element of the underlying document (e.g., a heading of the underlying document, an Lth level heading of the underlying document, such as a first-level heading of the underlying document). As another example, the bounding box classification for a particular bounding box may describe a section type of a section of the underlying document that corresponds to the particular bounding box. For example, the bounding box classification for a particular bounding box may describe the layout element associated with the particular bounding box (e.g., whether the particular bounding box depicts a page segment corresponding to a form, a table of connects, a heading, and/or the like).

In some embodiments, a bounding box classification machine learning model is configured to generate a bounding box classification for a bounding box of an image. In some embodiments, the bounding box classification machine learning model is configured to generate a convolutional representation of the bounding box (e.g., using one or more two-dimensional convolutional neural network layers) and process the convolutional representation (e.g., using one or more trained feedforward neural network layers, such as using one or more trained feedforward fully connected neural network layers). In some embodiments, inputs to the bounding box classification machine learning model comprise a matrix/two-dimensional array describing region/pixel values for an input bounding box. In some embodiments, outputs of the bounding box classification machine learning model comprise a vector describing, for each classification of two or more classifications associated with the bounding box classification machine learning model (e.g., a classification associated with heading-related bounding boxes and a classification associated with non-heading-related bounding boxes), a classification score, where the bounding box classification of the input bounding box is determined based at least in part on the class having the highest classification score. In some embodiments, outputs of the bounding box classification machine learning model comprise a vector and/or an atomic value describing the bounding box classification for the input bounding box. In some embodiments, the bounding box classification machine learning model is trained using ground-truth bounding box classification labels for a set of bounding boxes, for example ground-truth bounding box classification labels generated by subject matter experts.

In some embodiments, the bounding box classification machine learning model is configured to process feature data associated with a bounding box of an image to generate a bounding box classification for the bounding box. Examples of feature data for a bounding box include coordinates of the bounding box, indentation of the bounding box, pixel density of the bounding box. In some embodiments, inputs to the bounding box classification machine learning model include a feature vector describing features of an input bounding box.

In some embodiments, steps/operations 401-403 can be performed recursively T iterations on a document image set to identify Tth level headings of an underlying document. In some embodiments, during each tth iteration of the recursive routine associated with steps/operations 401-403, for each (t−1)th heading that is identified during the (t−1)th iteration, a per-heading subset of the document image set that describes the page images in the document image that correspond to the (t−1)th heading is generated and processed as an input document image set using steps/operations 401-403 to generate the tth level headings of the underlying document.

For example, given T=2 and given a document image set that comprises five pages, during the first iteration of the recursive routine associated with steps/operations 401-403, the document image set comprising five page images corresponding to the five pages is processed using the steps/operations 401-403 to detect first level headings as well as, for each first level heading, a subset of the five page images that corresponds to the first level headings. Let us assume that, after the first iteration, two first level headings $H_1$ and $H_2$ are identified, where $H_1$ corresponds to a bounding box detected in the first page image while $H_2$ corresponds to a bounding box detected in the fourth page image. In this case, during the second iteration, a document image set comprising the first page image, the second page image, the third page image, and the fourth page image is processed using the steps/operations 401-403 to detect second level headings for $H_1$, while a document image set comprising the fourth page image and the fifth page image is processed using the steps/operations 401-403 to detect second level headings for $H_2$. In some embodiments, a second level heading that corresponds to a bounding box of the fourth page image is determined to be a second level headings for $H_1$ if the bounding box occurs in a position before the bounding box corresponding to $H_1$, but is determined to be a second level headings for $H_2$ if the bounding box occurs in a position before the bounding box corresponding to $H_2$. In some embodiments, a heading corresponds to a bounding box if the heading is identified in response to determining that the bounding box classification for the bounding box describes that the bounding box is a heading.

Accordingly, using steps/operation 401-403, various embodiments of the present invention improve computational efficiency of performing segment-wise image classification on segments of images by introducing techniques for detecting optimal sizes for object differentiation kernels across image sets using optimizations performed in accordance with bounding box precision models. In some embodiments, given a bounding box precision model that relates primary kernel dimension sizes for an optimal object differentiation kernel to resulting bounding box counts, an optimal primary kernel dimension size for the object differentiation kernel can be computed with linear computational complexity or with less. This is a vast improvement over existing approaches for determining optimal image regions, such as sliding window approaches, that require performing various memory-intensive scans across entirety of input images in an image set. In this way, various embodiments of the present invention reduce the number of computer processor operations needed to perform segment-wise image classification on segments of images, improve computational complexity of performing segment-wise image classification on segments of images, and make important technical contributions to the fields of digital image processing and computer vision.

At step/operation 404, the predictive data analysis computing entity 106 performs one or more prediction-based actions based at least in part on the bounding box classification for the optimal bounding boxes of the document image set. Examples of prediction-based actions include performing an automated document analysis based at least in part on the bounding box classifications for optimal bounding boxes detected using a document image set to generate an inferred document layout for a corresponding document, generating one or more health-related predictions based at least in part on the inferred document layout, and then performing automatic appointment scheduling operations based at least in part on the one or more health-related predictions, generating automatic notifications for a recipient user profile based at least in part on the one or more health-related predictions, performing operational load balancing operations based at least in part on the one or more health-related predictions, performing navigation operations based at least in part on the one or more health-related predictions, and/or the like.

In some embodiments, performing the one or more prediction-based actions comprise generating user interface data for a prediction output user interface that is configured to depict a document layout for a document based at least in part on bounding box classifications for optimal bounding boxes detected using a document image set associated with the noted document. An operational example of such a prediction output user interface 800 is depicted in FIG. 8. As depicted in FIG. 8, the prediction output user interface 800 depicts first-level headings (e.g., first-level heading 801), second-level headings (e.g., second-level heading 802), and third-level headings (e.g., third-level heading 803) of a document associated with the document image set uploaded using the user interface element 811.

In some embodiments, to perform the prediction-based actions, the predictive data analysis computing entity 106 determines D bounding box classifications for D bounding boxes of a document image set. Then, the count of bounding boxes that are associated with a particular bounding box classification, along with a resource utilization ratio for each bounding box, can be used to predict a predicted number of computing entities needed to perform post-prediction processing operations (e.g., automated document processing operations) with respect to the D bounding boxes. For example, in some embodiments, the number of computing entities needed to perform post-prediction processing operations (e.g., automated document processing operations) with respect to D bounding boxes can be determined based at least in part on the output of the equation: $R=\operatorname{ceil}(\Sigma_k^{k=K} ur_k)$, where R is the predicted number of computing entities needed to perform post-prediction processing operations with respect to the D bounding boxes, ceil(.) is a ceiling function that returns the closest integer that is greater than or equal to the value provided as the input parameter of the ceiling function, k is an index variable that iterates over K bounding boxes among the D bounding boxes that are associated with the particular bounding box classification, and $ur_k$ is the estimated resource utilization ratio for a kth bounding box that may be determined based at least in part on a size of the kth bounding box. In some embodiments, once R is generated, the predictive data analysis computing entity 106 can use R to perform operational load balancing for a server system that is configured to perform post-prediction processing operations (e.g., automated document processing operations) with respect to the D bounding boxes. This may be done by allocating computing entities to the post-prediction processing operations if the number of currently-allocated computing entities is below R, and deallocating currently-allocated computing entities if the number of currently-allocated computing entities is above R.

Accordingly, as described above, various embodiments of the present invention improve computational efficiency of performing segment-wise image classification on segments of images by introducing techniques for detecting optimal sizes for object differentiation kernels across image sets using optimizations performed in accordance with bounding box precision models. In some embodiments, given a bounding box precision model that relates primary kernel dimension sizes for an optimal object differentiation kernel to resulting bounding box counts, an optimal primary kernel dimension size for the object differentiation kernel can be computed with linear computational complexity or with less. This is a vast improvement over existing approaches for determining optimal image regions, such as sliding window approaches, that require performing various memory-intensive scans across entirety of input images in an image set. In this way, various embodiments of the present invention reduce the number of computer processor operations needed to perform segment-wise image classification on segments of images, improve computational complexity of performing segment-wise image classification on segments of images, and make important technical contributions to the fields of digital image processing and computer vision.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
receiving, by one or more processors, an image of a document;
determining, by the one or more processors and using a bounding box precision model, a first plurality of declines associated with a plurality of candidate primary kernel dimension sizes;
generating, by the one or more processors, an optimal primary kernel dimension size that is (1) associated with a steepest decline of the first plurality of declines and (2) based at least in part on a first candidate primary kernel dimension size of the plurality of candidate primary kernel dimension sizes having a lowest derivative measure relative to the plurality of candidate primary kernel dimension sizes;
generating, by the one or more processors and based at least in part on an optimal object differentiation kernel and the optimal primary kernel dimension size, an optimal bounding box from the image of the document;
generating by the one or more processors and using an image classification machine learning model and the optimal bounding box, a bounding box classification for the optimal bounding box;
generating, by the one or more processors, an inferred document layout for the image of the document based at least in part on the bounding box classification; and
generating user interface data for a prediction output user interface that is configured to depict the inferred document layout for the image of the document.

2. The computer-implemented method of claim 1, further comprising generating, by the one or more processors, an image set to be processed by:
identifying an underlying image set comprising a group of underlying images;
identifying an image sampling rate for the underlying image set; and
generating the image set based at least in part on the underlying image set and the image sampling rate.

3. The computer-implemented method of claim 1, further comprising generating, by the one or more processors, an image set by:
identifying a document image set;
generating one or more image format categories each comprising a subset of an underlying image set, wherein the subset of the underlying image set comprises a group of underlying images and is associated with the document image set; and
generating the image set based at least in part on the subset of the underlying image set of an image format category of the one or more image format categories.

4. The computer-implemented method of claim 1, further comprising:
identifying, by the one or more processors, a secondary bounding box precision model, wherein the secondary bounding box precision model describes, for a candidate secondary kernel dimension size in a secondary kernel dimension size range, a respective resulting bounding box count when non-white areas of the image are differentiated in accordance with a secondary candidate object differentiation kernel whose primary kernel dimension size is determined based at least in part on the optimal primary kernel dimension size and whose secondary kernel dimension size is determined based at least in part on the candidate secondary kernel dimension size;
determining, by the one or more processors and using the secondary bounding box precision model, a second plurality of declines associated with the secondary kernel dimension size range;
generating, by the one or more processors and based at least in part on the secondary bounding box precision model, an optimal secondary kernel dimension size of the secondary kernel dimension size range, wherein the optimal secondary kernel dimension size is determined based at least in part on the candidate secondary kernel dimension size that is estimated to be associated with a steepest decline of the second plurality of declines in accordance with the secondary bounding box precision model; and
generating, by the one or more processors and based at least in part on the optimal primary kernel dimension size and the optimal secondary kernel dimension size, the optimal object differentiation kernel.

5. The computer-implemented method of claim 1, wherein the bounding box classification for the optimal bounding box describes a prediction about whether the optimal bounding box is associated with a heading of the document associated with the image.

6. The computer-implemented method of claim 1, wherein the image classification machine learning model is configured to generate the bounding box classification for the optimal bounding box based at least in part on a two-dimensional convolutional representation of the optimal bounding box.

7. The computer-implemented method of claim 1, wherein generating the optimal primary kernel dimension size comprises:
for the first candidate primary kernel dimension size, generating a derivative measure based at least in part on the bounding box precision model.

8. The computer-implemented method of claim 1, wherein generating the optimal primary kernel dimension size comprises:
performing an iterative derivative determination routine comprising, for the first candidate primary kernel dimension size in a primary kernel dimension size range starting from a smallest candidate primary kernel dimension size, in response to determining that a derivative measure for the first candidate primary kernel dimension size fails to satisfy a derivative threshold, adopting the first candidate primary kernel dimension size as the optimal primary kernel dimension size and terminating the iterative derivative determination routine.

9. A system comprising:
one or more processors; and
at least one memory storing processor-executable instructions that, when executed by any one or more of the one or more processors, cause the one or more processors to perform operations comprising:
receiving an image of a document;
determining, using a bounding box precision model, a first plurality of declines associated with a plurality of candidate primary kernel dimension sizes;
generating an optimal primary kernel dimension size that (1) is associated with a steepest decline of the first plurality of declines and (2) based at least in part on a first candidate primary kernel dimension size of the plurality of candidate primary kernel dimension sizes having a lowest derivative measure relative to the plurality of candidate primary kernel dimension sizes;

generating, based at least in part on an optimal object differentiation kernel and the optimal primary kernel dimension size, an optimal bounding box from the image of the document;

generating, using an image classification machine learning model and the optimal bounding box, a bounding box classification for the optimal bounding box;

generating an inferred document layout for the image of the document based at least in part on the bounding box classification; and generating user interface data for a prediction output user interface that is configured to depict the inferred document layout for the image of the document.

10. The system of claim 9, the processor-executable instructions that, when executed by any one or more of the one or more processors, further cause the one or more processors to perform operations comprising:

identifying an underlying image set comprising a group of underlying images;

identifying an image sampling rate for the underlying image set; and generating an image set for processing based at least in part on the underlying image set and the image sampling rate.

11. The system of claim 9, the processor-executable instructions that, when executed by any one or more of the one or more processors, further cause the one or more processors to perform operations comprising:

identifying a document image set;

generating one or more image format categories each comprising a subset of an underlying image set, wherein the subset of the underlying image set comprises a group of underlying images and is associated with the document image set; and generating an image set for processing based at least in part on the subset of the underlying image set of an image format category of the one or more image format categories.

12. The system of claim 9, wherein generating the optimal object differentiation kernel comprises:

identifying a secondary bounding box precision model, wherein the secondary bounding box precision model describes, for a candidate secondary kernel dimension size in a secondary kernel dimension size range, a respective resulting bounding box count when non-white areas of the image are differentiated in accordance with a secondary candidate object differentiation kernel whose primary kernel dimension size is determined based at least in part on the optimal primary kernel dimension size and whose secondary kernel dimension size is determined based at least in part on the candidate secondary kernel dimension size;

determining, using the secondary bounding box precision model, a second plurality of declines associated with the secondary kernel dimension size range;

generating, based at least in part on the secondary bounding box precision model, an optimal secondary kernel dimension size of the secondary kernel dimension size range, wherein the optimal secondary kernel dimension size is determined based at least in part on the candidate secondary kernel dimension size that is estimated to be associated with a steepest decline of the second plurality of declines in accordance with the secondary bounding box precision model; and generating the optimal object differentiation kernel based at least in part on the optimal primary kernel dimension size and the optimal secondary kernel dimension size.

13. The system of claim 9, wherein the bounding box classification for the optimal bounding box describes a prediction about whether the optimal bounding box is associated with a heading of the document associated with the image.

14. The system of claim 9, wherein the image classification machine learning model is configured to generate the bounding box classification for the optimal bounding box based at least in part on a two-dimensional convolutional representation of the optimal bounding box.

15. The system of claim 9, wherein generating the optimal primary kernel dimension size comprises:

for the first candidate primary kernel dimension size, generating a derivative measure based at least in part on the bounding box precision model.

16. The system of claim 9, wherein generating the optimal primary kernel dimension size comprises:

performing an iterative derivative determination routine comprising, for the first candidate primary kernel dimension size in a primary kernel dimension size range starting from a smallest candidate primary kernel dimension size, in response to determining that a derivative measure for the first candidate primary kernel dimension size fails to satisfy a derivative threshold, adopting the first candidate primary kernel dimension size as the optimal primary kernel dimension size and terminating the iterative derivative determination routine.

17. One or more non-transitory computer-readable storage media storing instructions that, when executed by one or more processors, cause the one or more processors to perform operations comprising:

receiving an image of a document;

determining, using a bounding box precision model, a first plurality of declines associated with a plurality of candidate primary kernel dimension sizes;

generating an optimal primary kernel dimension size that is (1) associated with a steepest decline of the first plurality of declines and (2) based at least in part on a first candidate primary kernel dimension size of the plurality of candidate primary kernel dimension sizes having a lowest derivative measure relative to the plurality of candidate primary kernel dimension sizes;

generating, based at least in part on an optimal object differentiation kernel and the optimal primary kernel dimension size, an optimal bounding box from the image of the document;

generating, using an image classification machine learning model and the optimal bounding box, a bounding box classification for the optimal bounding box;

generating an inferred document layout for the image of the document based at least in part on the bounding box classification; and generating user interface data for a prediction output user interface that is configured to depict the inferred document layout for the image of the document.

18. The one or more non-transitory computer-readable storage media of claim 17, further storing instructions that, when executed by one or more processors, further cause the one or more processors to perform operations comprising:

identifying an underlying image set comprising a group of underlying images;

identifying an image sampling rate for the underlying image set; and generating an image set for processing based at least in part on the underlying image set and the image sampling rate.

19. The one or more non-transitory computer-readable storage media of claim 17, further storing instructions that, when executed by one or more processors, further cause the one or more processors to perform operations comprising:
  identifying a document image set;
  generating one or more image format categories each comprising a subset of an underlying image set, wherein the subset of the underlying image set comprises a group of underlying images and is associated with the document image set; and
  generating an image set for processing based at least in part on the subset of the underlying image set of an image format category of the one or more image format categories.

20. The one or more non-transitory computer-readable storage media of claim 17, wherein generating the optimal object differentiation kernel comprises:
  identifying a secondary bounding box precision model, wherein the secondary bounding box precision model describes, for a candidate secondary kernel dimension size in a secondary kernel dimension size range, a respective resulting bounding box count when non-white areas of the image are differentiated in accordance with a secondary candidate object differentiation kernel whose primary kernel dimension size is determined based at least in part on the optimal primary kernel dimension size and whose secondary kernel dimension size is determined based at least in part on the candidate secondary kernel dimension size;
  determining, using the secondary bounding box precision model, a second plurality of declines associated with the secondary kernel dimension size range;
  generating, based at least in part on the secondary bounding box precision model, an optimal secondary kernel dimension size of the secondary kernel dimension size range, wherein the optimal secondary kernel dimension size is determined based at least in part on the candidate secondary kernel dimension size that is estimated to be associated with a steepest decline of the second plurality of declines in accordance with the secondary bounding box precision model; and
  generating the optimal object differentiation kernel based at least in part on the optimal primary kernel dimension size and the optimal secondary kernel dimension size.

\* \* \* \* \*